US012586167B2

(12) United States Patent
Tanaka et al.

(10) Patent No.: US 12,586,167 B2
(45) Date of Patent: Mar. 24, 2026

(54) MEDICAL IMAGE PROCESSING APPARATUS AND MEDICAL IMAGE PROCESSING METHOD

(71) Applicant: CANON KABUSHIKI KAISHA, Tokyo (JP)

(72) Inventors: Toru Tanaka, Chiba (JP); Ryo Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 17/480,895

(22) Filed: Sep. 21, 2021

(65) Prior Publication Data

US 2022/0092745 A1     Mar. 24, 2022

(30) Foreign Application Priority Data

Sep. 23, 2020     (JP) ................................. 2020-158455

(51) Int. Cl.
| | |
|---|---|
| *G06T 5/75* | (2024.01) |
| *G06T 5/30* | (2006.01) |
| *G06T 5/50* | (2006.01) |

(52) U.S. Cl.
CPC ................. *G06T 5/75* (2024.01); *G06T 5/30* (2013.01); *G06T 5/50* (2013.01); *G06T 2207/30061* (2013.01)

(58) Field of Classification Search
CPC .... G06T 5/75; G06T 5/30; G06T 5/50; G06T 2207/30061; G06T 2207/10081; G06T 2207/30048; G06T 7/62; G06T 7/0016
See application file for complete search history.

(56) References Cited

U.S. PATENT DOCUMENTS

| | | | | |
|---|---|---|---|---|
| 5,452,367 A * | 9/1995 | Bick | .......................... | G06T 7/11 |
| | | | | 382/128 |
| 7,545,979 B2 * | 6/2009 | Fidrich | ..................... | G06T 7/12 |
| | | | | 382/128 |

(Continued)

FOREIGN PATENT DOCUMENTS

| | | | | | |
|---|---|---|---|---|---|
| JP | 2017018457 A | * | 1/2017 | ............... | A61B 6/03 |

OTHER PUBLICATIONS

Zhang Y, Jing Y, Liang X, Xu G, Dong L. Dynamic lung modeling and tumor tracking using deformable image registration and geometric smoothing. Molecular & Cellular Biomechanics. Aug. 24, 2012;9(3):213-26. (Year: 2012).*

(Continued)

*Primary Examiner* — Emily C Terrell

(74) *Attorney, Agent, or Firm* — Canon U.S.A., Inc., IP Division

(57)     ABSTRACT

An information processing apparatus includes a first acquisition unit configured to acquire a first medical image of a target object and a second medical image of the target object captured at different time phases from each other, a second acquisition unit configured to acquire first contour information about the target object in the first medical image and second contour information about the target object in the second medical image, a generation unit configured to generate first processed information in which the first contour is blurred and second processed information in which the second contour is blurred, and a third acquisition unit configured to acquire deformation information about the target object between the first medical image and the second medical image based on the first processed information and the second processed information.

16 Claims, 5 Drawing Sheets

(56) References Cited

U.S. PATENT DOCUMENTS

| | | | | |
|---|---|---|---|---|
| 2004/0183825 A1* | 9/2004 | Stauder | H04N 5/222 | |
| | | | 348/E5.022 | |
| 2004/0263514 A1* | 12/2004 | Jin | G06V 20/13 | |
| | | | 345/589 | |
| 2007/0103668 A1* | 5/2007 | Xu | G01N 15/1433 | |
| | | | 356/36 | |
| 2009/0022379 A1* | 1/2009 | Tashiro | G06T 7/33 | |
| | | | 382/131 | |
| 2009/0129635 A1* | 5/2009 | Abe | G06V 10/26 | |
| | | | 382/199 | |
| 2012/0320055 A1* | 12/2012 | Pekar | G06T 7/143 | |
| | | | 345/424 | |
| 2014/0146996 A1* | 5/2014 | Vajen | G06T 5/70 | |
| | | | 382/100 | |
| 2014/0270540 A1* | 9/2014 | Spector | G06T 7/162 | |
| | | | 382/199 | |
| 2017/0039725 A1* | 2/2017 | Dror | G06T 7/12 | |
| 2017/0344846 A1* | 11/2017 | Yoshida | A61B 5/1172 | |
| 2019/0325637 A1* | 10/2019 | Liu | G06T 5/70 | |
| 2022/0036570 A1* | 2/2022 | Aizaki | G06T 5/50 | |
| 2022/0076391 A1* | 3/2022 | Kang | H04N 23/698 | |
| 2023/0005140 A1* | 1/2023 | Ferl | G06T 7/11 | |

OTHER PUBLICATIONS

Zhou S, Cheng Y, Tamura S. Automated lung segmentation and smoothing techniques for inclusion of juxtapleural nodules and pulmonary vessels on chest CT images. Biomedical Signal Processing and Control. Sep. 1, 2014;13:62-70. (Year: 2014).*

Zhou, Shengjun, Yuanzhi Cheng, and Shinichi Tamura. "Automated lung segmentation and smoothing techniques for inclusion of juxtapleural nodules and pulmonary vessels on chest CT images." Biomedical Signal Processing and Control 13 (2014): 62-70. (Year: 2014).*

El-Ba, Ayman, et al. "A new stochastic framework for accurate lung segmentation." Medical Image Computing and Computer-Assisted Intervention—MICCAI 2008: 11th International Conference, New York, NY, USA, Sep. 6-10, 2008, Proceedings, Part I 11. Springer Berlin Heidelberg, 2008. (Year: 2008).*

Mirza F. Beg et al; "Computing Large Deformation Metric Mappings via Geodesic Flows of Diffeomorphisms"; International Journal of Computer Vision, 61(2), 139-157, 2005; pp. 1-19.

* cited by examiner

MEDICAL IMAGE PROCESSING APPARATUS AND MEDICAL IMAGE PROCESSING METHOD

BACKGROUND

Field of the Disclosure

The present disclosure relates to an information processing apparatus, an information processing method, and a non-transitory storage medium.

Description of the Related Art

In medical fields, a doctor diagnoses a subject using medical images acquired by imaging an observed part (target object) that is an observation target of the subject using various modalities. In particular, in a case where the observed part is a part where the presence or absence of a disease or a condition thereof appear in a movement of an organ, such as a lung or heart, images captured at a plurality of time phases are sometimes observed in making a diagnosis.

There is a technique for assisting the observation of the images captured at a plurality of time phases. Specifically, registration between the images is performed so that a movement of an observed part can be analyzed, and information about the movement is presented. Mirza F. Beg, Michael I. Miller, Alain Trouve et al: Computing Large Deformation Metric Mappings via Geodesic Flows of Diffeomorphisms. International Journal of Computer Vision, 61(2), 139-157, 2005 discusses an image registration method that is a smooth non-linear registration method maintaining a topology. The method provides an advantage that, for example, in performing registration between medical images, a deformation that cannot occur in a living body can be reduced. However, in the method, registration is performed on an entire image including the region neighboring the observed part using, for example, the technique discussed in Mirza F. Beg, Michael I. Miller, Alain Trouve et al: Computing Large Deformation Metric Mappings via Geodesic Flows of Diffeomorphisms. International Journal of Computer Vision, 61(2), 139-157, 2005, a local change near the contour of the observed part may adversely affect an estimation of deformation. This gives rise to an issue that accuracy of registration between inside regions of the observed part decreases.

SUMMARY

The present disclosure provides a method in which a medical image includes not only an observed part but also a region neighboring the observed part, and there is a contour as a boundary between the observed part and the region neighboring the observed part.

The present disclosure is directed to an information processing apparatus, an information processing method, and a recording medium storing a program that reduce an adverse effect of a local change near a boundary between an observed part (target object) and a region outside the observed part on the estimation of deformation.

According to an aspect of the present invention, an information processing apparatus includes a first acquisition unit configured to acquire a first medical image of a target object and a second medical image of the target object captured at different time phases from each other, a second acquisition unit configured to acquire first contour information about a first contour being a boundary between the target object and a region outside the target object in the first medical image and second contour information about a second contour being a boundary between the target object and a region outside the target object in the second medical image, a generation unit configured to generate first processed information in which the first contour is blurred based on the first contour information or the second contour information and second processed information in which the second contour is blurred based on the first contour information or the second contour information, and a third acquisition unit configured to acquire deformation information about a deformation in the target object between the first medical image and the second medical image based on the first processed information and the second processed information.

Further features of the present invention will become apparent from the following description of exemplary embodiments with reference to the attached drawings.

DESCRIPTION OF THE EMBODIMENTS

Figure 1:
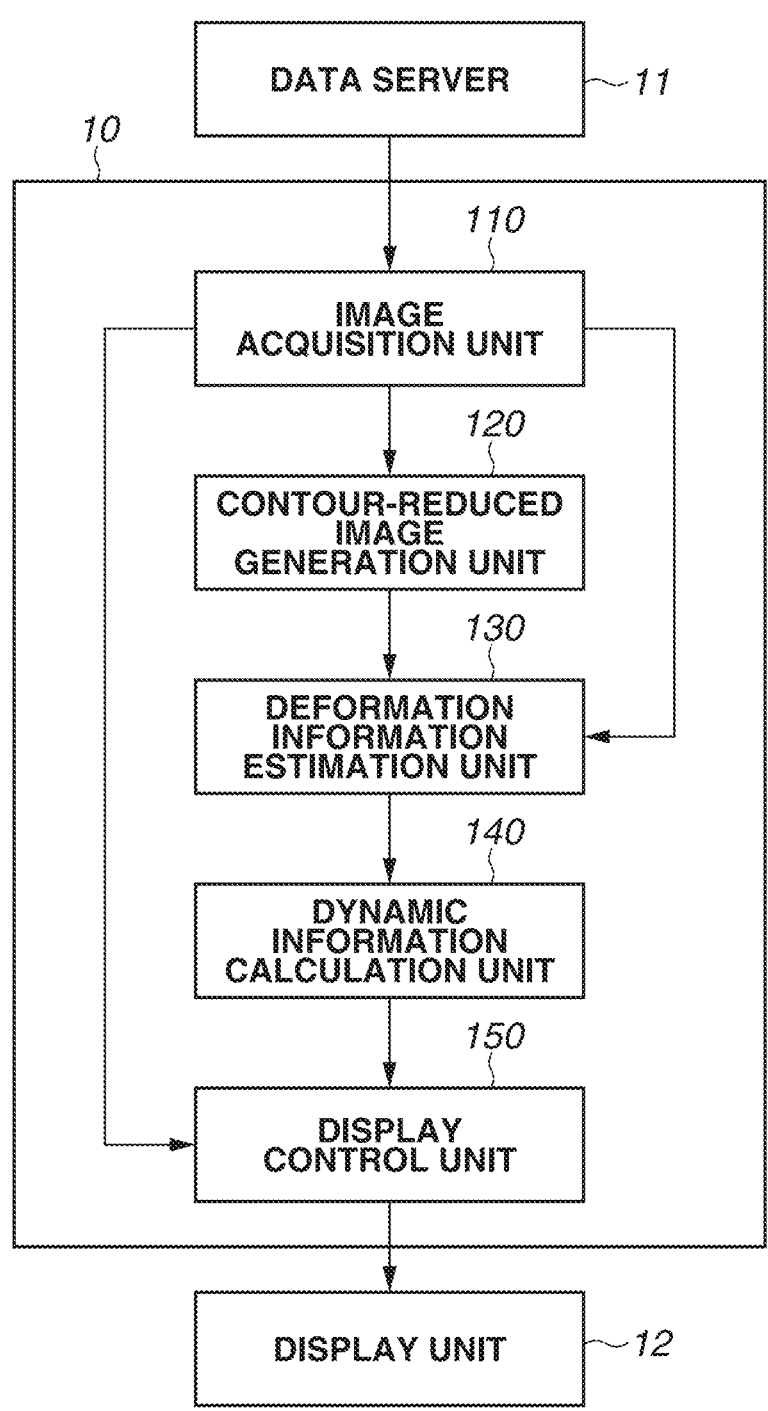
FIG. 1 is a diagram illustrating an example of a device configuration of an information processing apparatus according to a first exemplary embodiment.

Various exemplary embodiments of an information processing apparatus according to the disclosure of the present specification will be described in detail below with reference to the attached drawings. Components according to the exemplary embodiments are mere examples, and the technical scope of the information processing apparatus according to the disclosure of the present specification is defined by the claims and is not to be limited by each exemplary embodiment described below. Further, the disclosure of the present specification is not limited to the below-described exemplary embodiments, and various modifications can be made based on the spirit of the disclosure of the present specification and are not to be excluded from the scope of the disclosure of the present specification. Specifically, combinations of the below-described exemplary embodiments and modifications thereof are all included in the exemplary embodiments of the disclosure of the present specification.

An information processing apparatus according to a first exemplary embodiment is an apparatus that acquires images of an observed part (target object) of a subject that are captured at a plurality of time phases, analyzes the acquired images to obtain dynamic information about the observed part between the images, and stores or displays the obtained dynamic information. The information processing apparatus according to the present exemplary embodiment includes a registration function for estimating deformation information in order to obtain the dynamic information about the observed part between the images captured at the plurality of time phases. The deformation information is information about deformation of the observed part between the images. Furthermore, the information processing apparatus according to the present exemplary embodiment performs processing of blurring a contour in a contour portion, which is a region including the contour being a boundary between the observed part and a region outside the observed part, in estimating the deformation information about the observed part. Then, a contour-reduced image (also referred to as a processed image or processed information) in which contour information about the contour portion is reduced by the above-described processing is generated and used. This reduces an effect of a local change in contour shape of the observed part on the estimation of deformation, and deformation information about an inside region of the observed part between the images is estimated with great accuracy. Then, dynamic information about the observed part is calculated from the deformation information and displayed, so that a user can observe the dynamic information about the observed part between the images with ease.

A configuration and a process according to the present exemplary embodiment will be described below with reference to FIGS. 1 to 5.

In the present exemplary embodiment, the observed part is lungs, and three-dimensional images of the lungs that are captured at two time phases of different respiratory conditions using an X-ray computed tomographic (X-ray CT) apparatus will be described as an example. Implementation of the information processing apparatus according to the disclosure of the present specification is not limited to the one described herein, and captured images of a part that moves voluntarily, such as a heart, can be employed. Alternatively, captured images of a part moved (e.g., bent and stretched) by a subject can be employed.

FIG. 1 illustrates a configuration of an information processing apparatus according to the present exemplary embodiment. As illustrated in FIG. 1, an information processing apparatus 10 according to the present exemplary embodiment is connected to a data server 11 and a display unit 12.

The data server 11 stores images (first and second medical images) of an observed part that are captured at two different time phases. The first and second medical images are three-dimensional tomographic images (volume data) acquired by capturing images of the same subject in advance using the same modality. The first and second medical images herein can be time-series images captured at consecutive time points in a single examination or can be images captured in different examinations on different dates. The modality for capturing the three-dimensional tomographic images can be a magnetic resonance imaging (MRI) apparatus, a three-dimensional ultrasonic imaging apparatus, a photoacoustic tomographic apparatus, a positron emission tomographic/single photon emission computed tomographic (PET/SPECT) apparatus, or an optical coherence tomographic (OCT) apparatus instead of the X-ray CT apparatus. Two-dimensional images captured by a plain radiographic apparatus or a two-dimensional ultrasonic apparatus can be employed instead of the three-dimensional images. The first and second medical images are input to the information processing apparatus 10 via an image acquisition unit 110 of the information processing apparatus 10.

The display unit 12 is a monitor that displays the first and second medical images and dynamic information calculated by the information processing apparatus 10.

The information processing apparatus 10 includes the following components. The image acquisition unit 110 (also referred to as a first acquisition unit) acquires the first and second medical images input to the information processing apparatus 10. A contour-reduced image generation unit 120 (also referred to as a generation unit or a second acquisition unit) generates a first contour-reduced image (also referred to as first processed information or a first processed image) and a second contour-reduced image (also referred to as second processed information or a second processed image). The first contour-reduced image is an image generated by reducing contour information (also referred to as first contour information) about a contour portion (also referred to as a first contour portion). The contour portion is a region that includes a contour (also referred to as a first contour), and the contour is a boundary between an observed part and a region outside the observed part in the first medical image. The second contour-reduced image is an image generated by reducing contour information (also referred to as second contour information) about a contour portion (also referred to as a second contour portion). The contour portion is a region that includes a contour (also referred to as a second contour), and the contour is a boundary between an observed part and a region outside the observed part in the second medical image. The processing of reducing the contour information includes, for example, contour blurring processing and is performed independently of a region that is inside the observed part and is not included in the contour portion in the first and second medical images. A deformation information estimation unit 130 (also referred to as a third acquisition unit) estimates and acquires deformation information about the observed part between the first and second medical images using the first and second contour-reduced images. A dynamic information calculation unit 140 (also referred to as a fourth acquisition unit) acquires dynamic information based on the deformation information. The dynamic information is information about a movement of the observed part. The dynamic information herein refers to, for example, a local movement amount or a volume change rate of the observed part. A display control unit 150 performs display control to display the first and second medical images and the dynamic information about the observed part on the display unit 12.

The foregoing components of the information processing apparatus 10 each function based on a computer program.

For example, a central processing unit (CPU) reads a computer program stored in a read-only memory (ROM) or a storage unit and executes the read computer program using a random access memory (RAM) as a work area to implement the functions of the components. Alternatively, the functions of the components of the information processing apparatus 10 can partially or entirely be implemented by use of a dedicated circuit. Further, functions of components of the CPU can partially be implemented by use of a cloud computer.

For example, a computation apparatus situated at a different location from the location of the information processing apparatus 10 can communicably be connected to the information processing apparatus 10 via a network, and the information processing apparatus 10 and the computation apparatus can transmit and receive data to and from each other to implement the functions of the components of the information processing apparatus 10.

Next, an example of a process performed by the information processing apparatus 10 illustrated in FIG. 1 will be described below with reference to FIG. 2.

Figure 2:
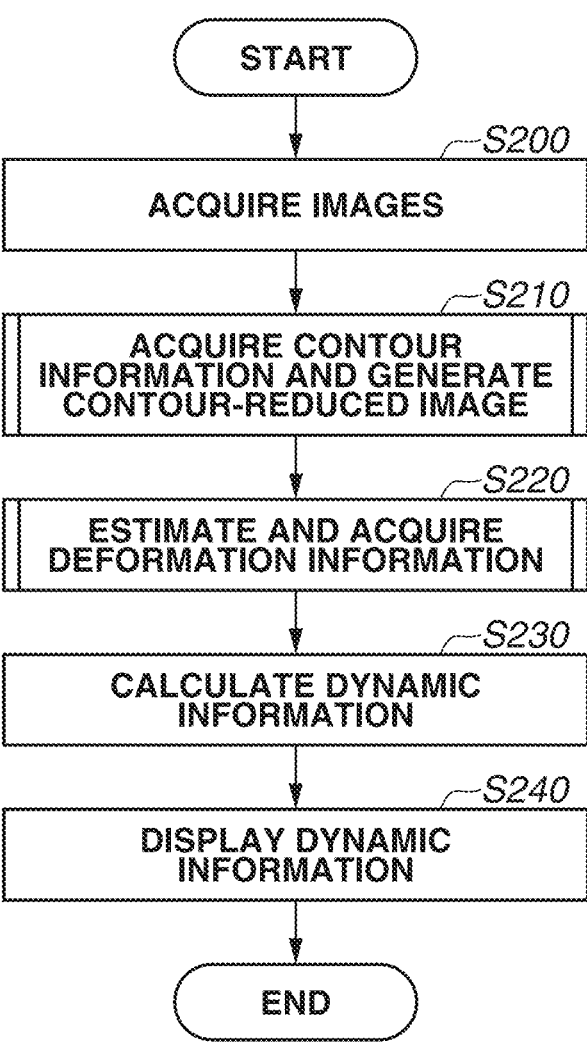
FIG. 2 is a flowchart illustrating an example of an entire process according to the first exemplary embodiment.

FIG. 2 is a flowchart illustrating an entire process performed by the information processing apparatus 10.

(Step S200) (Image Acquisition)

In step S200, the image acquisition unit 110 (first acquisition unit) acquires the first and second medical images from the data server 11. Specifically, in a case where the observed part is, for example, the lungs, a maximal inspiratory level image is acquired as the first medical image and a maximal expiratory level image is acquired as the second medical image. Then, the image acquisition unit 110 outputs the acquired first and second medical images to the contour-reduced image generation unit 120, the deformation information estimation unit 130, and the display control unit 150.

While the maximal inspiratory level image and the maximal expiratory level image are acquired as described above in the present exemplary embodiment, implementation of the present invention is not limited to one described herein. In a case where a movement of lung fields by breathing of the subject can be imaged, images captured at time phases of other respiratory conditions can be acquired. For example, in analyzing time-series CT images (CT moving images, four-dimensional CT (4DCT) images) including CT images captured at a plurality of consecutive time phases, CT images captured at contiguous time phases can be acquired.

(Step S210) (Contour-Reduced Image Generation)

In step S210, the contour-reduced image generation unit 120 (generation unit, second acquisition unit) extracts the position of the contour of the observed part (acquires contour information) from the first medical image and generates the first contour-reduced image (also referred to as the first processed information) in which the inside region that is in the observed part and is not included in the first contour portion is relatively emphasized by reducing the first contour information about the first contour portion, which is the region including the first contour that is the boundary between the observed part and the region outside the observed part in the first medical image. Similarly, the contour-reduced image generation unit 120 generates the second contour-reduced image (also referred to as the second processed information) in which the inside region that is in the observed part and is not included in the second contour portion is relatively emphasized by reducing the second contour information about the second contour portion, which is the region including the second contour that is the boundary between the observed part and the region outside the observed part in the second medical image. Then, the contour-reduced image generation unit 120 outputs the generated first and second contour-reduced images to the deformation information estimation unit 130 (also referred to as the third acquisition unit).

Figure 3:
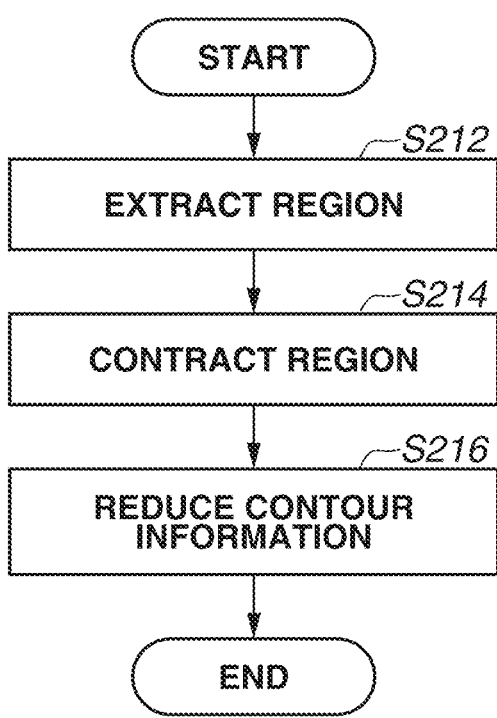
FIG. 3 is a flowchart illustrating an example of a process of generating a contour-reduced image (also referred to as processed information) according to the first exemplary embodiment.

FIG. 3 is a flowchart illustrating an example of a process of step S210 in more detail. Details of the process of step S210 will be described below with reference to FIG. 3.

(Step S212) (Region Extraction)

In step S212, the contour-reduced image generation unit 120 generates a first label image by extracting a region of the observed part from the first medical image. Similarly, the contour-reduced image generation unit 120 generates a second label image by extracting a region of the observed part from the second medical image. In step S212, the region inside the contour, which is the boundary between the observed part and the region outside the observed part, is extracted as the region of the observed part.

In the present exemplary embodiment, the label images store a predetermined pixel value such as a pixel value=255 in each pixel (foreground pixel) corresponding the extracted region of the observed part and store a predetermined pixel value such as a pixel value=0 different from the predetermined pixel value stored for the extracted region in each pixel (background pixel) corresponding to the unextracted region.

A known image processing method can be used in extracting the region of the observed part from the images. For example, a threshold processing method using a threshold value for pixel values can be used, or a known segmentation processing method such as graph cut processing can be used. Alternatively, a user can manually extract the region of the observed part using drawing software (not illustrated), or the region of the observed part that is extracted using a known image processing method and is manually modified by a user can be employed. In the present exemplary embodiment, a lung region is extracted from the first and second medical images using a known segmentation method for extracting the lung region from a CT image.

(Step S214) (Region Contraction)

In step S214, the contour-reduced image generation unit 120 generates a first masked image in which a foreground pixel region in the first label image is contracted. Similarly, the contour-reduced image generation unit 120 generates a second masked image in which a foreground pixel region in the second label image is contracted. In other words, the region contraction herein refers to forming a masked image by moving the boundary of the foreground pixel region further inside of the foreground pixel region, i.e., inside of the contour, in the first label image.

In the present exemplary embodiment, a known image processing technique such as morphology transformation contraction processing can be used in contraction processing of the foreground pixel region.

Step S214 is directed to modifying the region extracted in step S212 considering in advance that there may be a case where a region larger than the region of the observed part is extracted (over-extracted). This produces an advantage that an effect of an over-extracted region can be reduced in performing mask processing on the first and second medical images using the masked images generated in step S214 in subsequent step S216.

Specifically, the advantage is produced in a case where, for example, the contour of the observed part has a distinct image feature while an image feature of a region near the contour of the inside region of the observed part is indistinct. For example, an organ such as the lungs is significantly different in pixel value from neighboring tissue (a bone or other organs), so that a contour has a distinct image feature. On the contrary, the image feature of the region near the contour of the inside region is indistinct because blood vessels, which are a major feature in the lungs, become thinner near the contour and are not resolved on the image. In this case, if the region of the observed part is over-extracted, pixels of neighboring tissue may be also acquired as the observed part in acquiring the region of the image corresponding to the foreground pixels by the mask processing, and this may become noise in subsequent registration processing. Thus, in the present exemplary embodiment, the noise is reduced by using the masked images acquired in step S214 in which the regions are contracted. Performing the mask processing using the masked images in a situation where over-extraction does not occur may partially trim the inside region, but in a case where the image feature of the inside region of the observed part near the contour is indistinct, the risk of losing the image feature is low. Specifically, it is desirable to determine a contraction size based on the image feature of the inside region of the observed part. Further, it is desirable to set a suitable size for each observed part. Specifically, for example, in a case where a feature, such as blood vessels, of a region that is about 3 mm inside the contour of the organ of the observed part is not resolved on the image, the masked image is generated by contracting the foreground pixel region of the label image by about 3 mm from the contour. The contraction size does not necessarily have to be the same as the size of the region where the feature of the inside region is not resolved as described above. The contraction size does not have to be a fixed size for the observed part and can be changed for each area in the observed part. For example, the contraction size can be changed based on intensity of the image feature near the contour of the observed part. Specifically, the contraction size can be increased in a case where there is a significant difference in pixel value between the contour of the observed part and the inside region (the intensity of the image feature of the contour is high).

The region including the contour trimmed by mask processing will be referred to as the contour portion.

(Step S216) (Contour Information Reduction)

In step S216, the contour-reduced image generation unit 120 generates the first contour-reduced image (first processed information or first processed image) in which the contour information about the observed part is reduced (blurred) by the mask processing performed on the first medical image using the first masked image. Similarly, the contour-reduced image generation unit 120 generates the second contour-reduced image (second processed information or second processed image) in which the contour information about the observed part is reduced (blurred) by the mask processing performed on the second medical image using the second masked image.

In the mask processing in step S216, in a case where the pixel at the corresponding position in the first masked image to a pixel in the first contour-reduced image is a foreground pixel, the pixel value of the pixel at the corresponding position in the first medical image is stored in the pixel in the first contour-reduced image. On the other hand, in a case where the pixel in the first masked image is a background pixel, a representative value of the pixel value of the observed part is stored. The representative value herein is desirably a value close to the pixel value of the inside region near the contour of the observed part. Consequently, the gradient of the pixel values near the contour of the observed part in the contour-reduced image after the mask processing is decreased so that the contour is blurred to reduce the contour information. Further, the second contour-reduced image is generated from the second medical image by a similar method. In other words, in the above-described processing, the target region for the reduction of the contour information including the contour of the observed part corresponds to the contour portion including the contour, which is the boundary between the foreground image (corresponding to the observed part) and the region outside the foreground image, and processing of blurring the contour in the contour portion (processing of reducing the contour information) by the mask processing is performed. The blur processing herein includes not only the processing of erasing the contour by the mask processing described above but also the processing of decreasing the gradient of the pixel values that are adjacent to each other in the contour portion. The contour portion that is the target region for the reduction of the contour information includes at least the contour and can be a region including the contour and pixels neighboring (outside and inside) the contour. Further, the contour portion can be a region including the contour and the pixels outside the contour but not including the pixels inside the contour.

Figure 4:
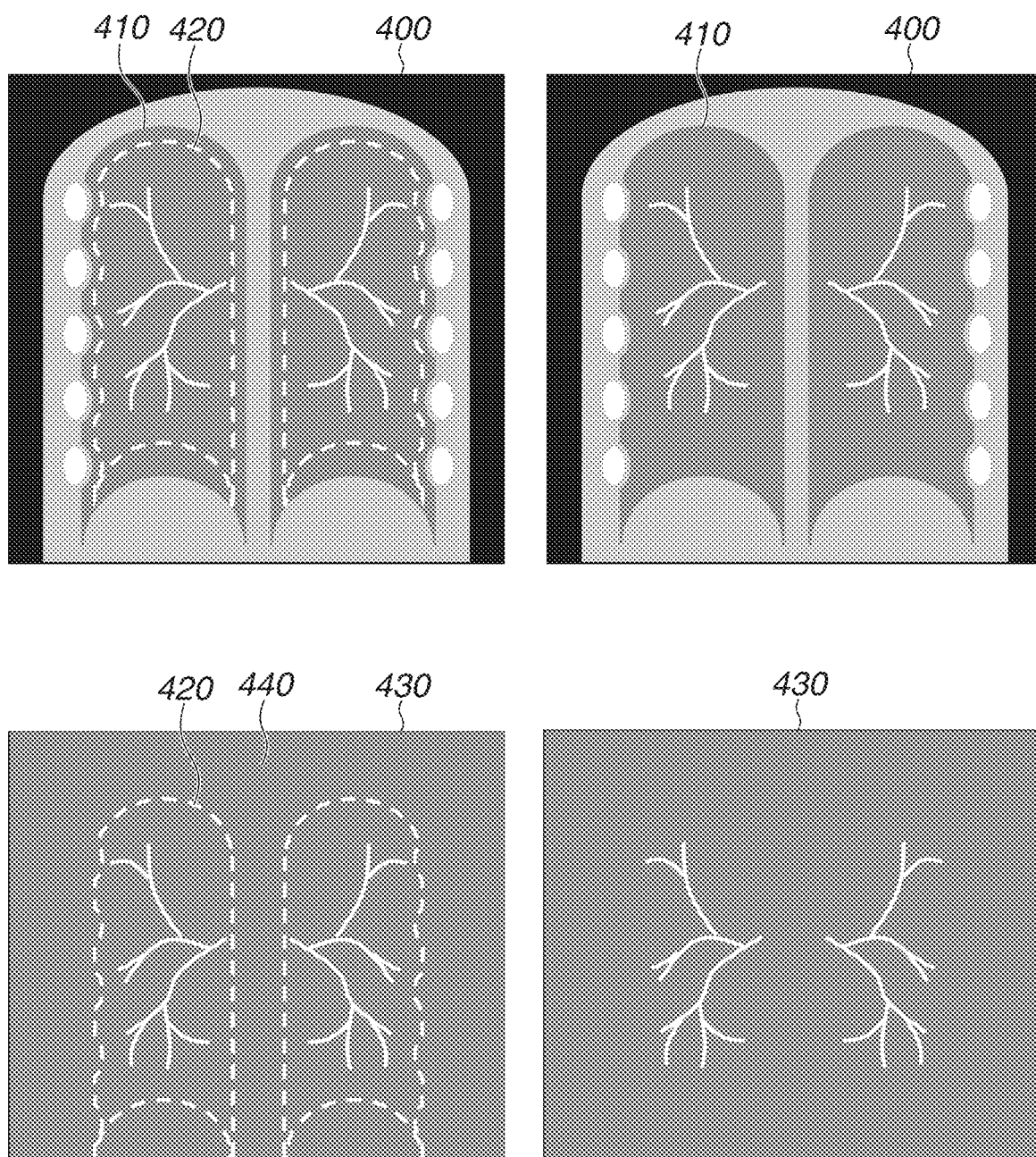
FIG. 4 is a diagram illustrating an example of a contour-reduced image (also referred to as processed information) according to the first exemplary embodiment.

The case where the observed part is the lungs will be used as an example to describe the mask processing for reducing the contour information in detail. In the present exemplary embodiment, an average pixel value of an air region of the entire lungs is used as the representative value. FIG. 4 illustrates a specific example. In FIG. 4, an image 400 is an example of the first medical image, and broken lines 420 drawn inside the lungs that are an observed part 410 along the contours of the lungs indicate the positions of the contours of the foreground pixel regions in the first masked image. In this case, as described above, the pixel value of a pixel at the corresponding position in the first medical image to a pixel of the first contour-reduced image that corresponds to a position of the foreground pixels of the first masked image surrounded by the broken lines 420 is stored in the pixel of the first contour-reduced image. Further, the average pixel value of the air region of the entire lungs used as the representative value is stored in each pixel of the first contour-reduced image that corresponds to a position of the background pixels of the first masked image outside the broken lines 420. As a result, the first contour-reduced image illustrated as an image 430 is generated. In the example in FIG. 4, the region outside the broken lines 420 corresponds to a contour portion 440. As illustrated in FIG. 4, the contour-reduced image according to the present exemplary embodiment corresponds to an image in which information about the inside of the lung fields is relatively emphasized (e.g., only the information about the inside of the lung fields is retained) by reducing (blurring) the contour information about the lungs. In other words, the above-described processing of blurring the contour in the contour portion 440 is performed independently of the region (also referred to as the inside region) that is inside the observed part (inside the lung fields) and is not included in the contour portion 440. In the above-described example, the processing of blurring the contour in the contour portion 440 is also performed on the region outside the observed part.

The representative value of the observed part does not have to be the average pixel value. For example, the representative value can be another statistical value such as a median value of the pixel values of the region of the observed part. Further, a search for a foreground pixel at the nearest neighbor position to the position of each background pixel of the first masked image can be performed to store the pixel value of the first medical image at the corresponding position to the foreground pixel in the pixel of the first contour-reduced image. Alternatively, in a case where a range of possible pixel values in the region near the contour of the observed part is known, a predetermined value designated in advance by a user based on the range can be determined as the representative value.

Consequently, the first contour-reduced image (first processed information or first processed image) and the second contour-reduced image (second processed information or second processed image) in which the inside region of the observed part is relatively emphasized by reducing the contour information about the observed part are generated from the first and second medical images. In another method of emphasizing an inside region of an organ, for example, the structure of the inside region of the organ can be emphasized directly by performing line emphasis processing. However, in a case where the inside region to be emphasized has a thin structure such as blood vessels as in the case of an organ, information about the inside region may partially be lost depending on a parameter of the emphasis processing. Meanwhile, it is often comparatively easier to extract the contour of an organ than to emphasize the inside region directly. In such a case, it is comparatively easier to emphasize the inside region relatively by reducing the contour information about the observed part than to emphasize the inside region directly. Furthermore, there is also an advantage that the risk of losing the information about the inside region is low because the processing of converting a pixel value is not performed on the inside region other than the region near the contour.

As a result of the foregoing process, the contour-reduced images in which the contour of the observed part is reduced are generated.

(Step S220) (Estimation of Deformation Information)

In step S220, the deformation information estimation unit 130 (also referred to as the third acquisition unit) estimates and acquires deformation information about the observed part between the first and second medical images based on the first contour-reduced image (first processed information or first processed image) and the second contour-reduced image (second processed information or second processed image). Then, the deformation information estimation unit 130 outputs the acquired deformation information to the dynamic information calculation unit 140.

Figure 5:
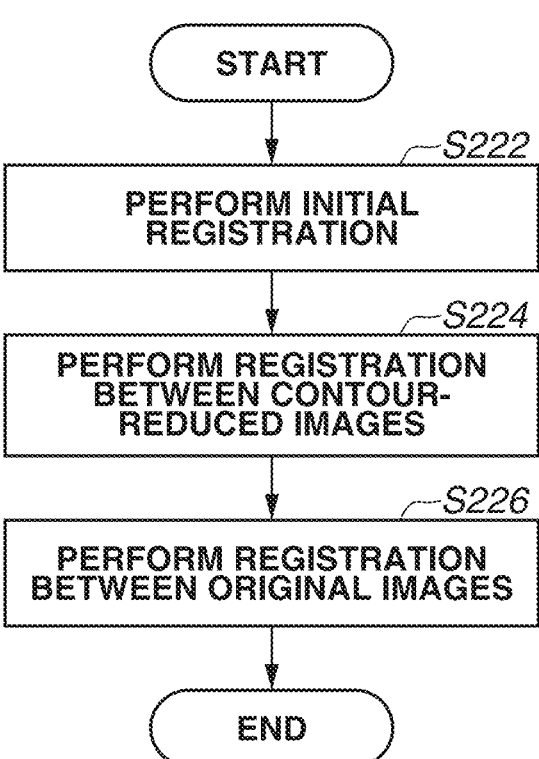
FIG. 5 is a flowchart illustrating an example of a process of acquiring deformation information according to the first exemplary embodiment.

In the present exemplary embodiment, the registration processing for estimating the deformation information between the first and second medical images is performed in multiple steps. FIG. 5 is a flowchart illustrating an example of a multi-step registration process in step S220 in more detail. In step S220, first, in step S222 in FIG. 5, initial registration processing is performed for rough registration between the observed parts in the first and second medical images. Next, in step S224, registration processing between the first and second contour-reduced images is performed based on a result of the initial registration processing. Lastly, in step S226, the deformation information between the first and second medical images is estimated based on a result of the registration processing. Details of each step will be described below with reference to FIG. 5.

(Step S222) (Initial Registration)

In step S222, the deformation information estimation unit 130 performs the initial registration processing for rough registration between the observed parts in the first and second medical images and acquires a result of the initial registration processing as first deformation information.

In the present exemplary embodiment, the rough registration is performed using images generated by decreasing resolution of the first and second medical images. This is based on the basic idea of "coarse-to-fine" in general multi-step registration processing, and the low-resolution images are used in an initial registration step for the following reason. Before the registration, the positions of two images are often misregistered significantly, and in this case, information indicating that the values of each pixel correspond or do not correspond between the high-resolution images becomes noise in the registration processing. Specifically, the risk of falling into a local solution in the registration processing increases. Use of low-resolution images has an advantage in that rough image information is selectively used, so that use of low-resolution images in the initial step of the registration processing is advantageous.

A known image processing method can be used in the registration processing in step S222. For example, non-linear registration is performed to deform one of the images to increase image similarity between the images after the deformation. For the image similarity, a commonly-used known method can be used, such as the sum of squared known method can be used, such as the sum of squared differences (SSD), the mutual information amount, or the cross-correlation coefficient. Further, a known deformation model such as a deformation model based on a radial basis function, e.g., thin plate spline (TPS), free form deformation (FFD), or large deformation diffeomorphic metric mapping (LDDMM) can be used as an image deformation model.

In the initial registration processing, it is sufficient that the rough registration is performed, and non-linear registration does not necessarily have to be performed. For example, linear registration can be performed based on a rigid transformation or an affine transformation in which only a translation amount and a rotation amount are estimated to increase the image similarity between the images.

Images for use in the initial registration processing do not have to be images generated by reducing the resolution of the first and second medical images. For example, the initial registration processing can be performed based on the first and second label images acquired in step S212. In this case, the positions of the contours of the regions specified by the foreground pixels of the label images are acquired as a point cloud, and a known method of registration between point clouds such as an iterative closest point method is used for the rough registration to be achieved between the observed parts in the first and second medical images.

(Step S224) (Registration Between Contour-Reduced Images)

In step S224, the deformation information estimation unit 130 (execution unit) performs registration between the first and second contour-reduced images using the first deformation information acquired in step S222 as an initial value and acquires a result of the registration as second deformation information.

In registration between medical images, a regularization term for constraining a degree of freedom of deformation is taken into consideration to prevent a deformation that cannot occur in a living body. During the registration between the observed parts in the images, if there is a change (deformation) in the contour shape of the observed part between the images, accuracy of registration between the inside regions may decrease due to an effect of the deformation. In the present exemplary embodiment, registration is performed between the images in which the contour information about the observed part is reduced, so that an effect of the estimation of contour deformation between the images can be reduced, and the registration between the inside regions are selectively adjusted to correspond.

A case where the observed part is the lungs will be described as a specific example below. The shape of the entire lungs is deformed by expansion and contraction of muscles around the lungs, and the structure of the inside region (blood vessels, tracheas) of the lungs is also deformed by the deformation. In addition to the deformations, a local deformation occurs in the contour of the lungs along the shape (e.g., depressions and projections of ribs and inter-costal muscles) around the lungs. However, unlike a significant deformation that occurs to the entire lungs, the local deformation that occurs in the contour of the lungs may not affect the inside region of the lungs. A situation where portions of the contour shape of the lungs that are in contact with the ribs are pressed by the ribs and are slightly depressed (to cause depressions and projections in the contour shape of the lungs) compared to neighboring portions thereof that are in contact with the intercostal muscles will be discussed as an example below. Since the first and second medical images are different in the time phases of breathing (the lungs expand differently), there arises a change in the relative position of the contour portion with respect to the ribs between the images. Specifically, there may be a case where a contour portion that is in contact with a rib and is depressed in the first medical image may be shifted in position by the breathing and the contour portion may be in contact with an intercostal muscle and may not be depressed in the second medical image. In other words, there may be a case where a contour portion that is in contact with a certain rib and is depressed differs between the images. In this case, use of the first and second medical images directly in the registration may result in associating the depressed portions as the same part and, consequently, the accuracy of registration may decrease. Thus, the first and second contour-reduced images are used in the registration to reduce an effect of a local change in the contour shape of the lungs on the estimation of deformation, and the registration between the inside regions is selectively performed.

In other words, the deformation information estimation unit 130 performs registration between the first and second contour-reduced images in which the contour is reduced, so that a contribution rate of the contour of the lungs in the first medical image to the contour of the lungs in the second medical image with respect to the registration is decreased to be lower than a contribution rate of the region inside the contour.

(Step S226) (Registration Between Original Images)

In step S226, the deformation information estimation unit 130 estimates and acquires third deformation information between the first medical image and the second medical image using the second deformation information acquired in step S224 as an initial value. Then, the deformation information estimation unit 130 outputs the third deformation information as final deformation information between the first and second medical images to the dynamic information calculation unit 140.

Since the registration between the inside regions is performed using the contour-reduced images in step S224, there may be a case where the contour shapes do not match between the first and second medical images. In step S226, registration is performed between original images (the first and second medical images) including the structure of the contour shape of the observed part and the structure of the inside region of the observed part, so that the registration between the contour shapes is achieved to prevent misregistration between the inside regions. In order to perform more detailed registration, it is desirable to use images with a higher resolution in step S226 than the resolution of the images used in the registration in steps S222 and S224. Alternatively, in a case where the regularization term for constraining the degree of freedom of deformation is set in step S224, the regularization term that increases the degree of freedom of deformation to a higher degree than that in step S224 can be used in the registration.

An advantage of performing registration between the inside regions using the contour-reduced images before the original images will be described below. As described above, in the registration between the images including the contour information, the effect of the local change in the contour on the estimation of deformation decreases the accuracy of the registration between the inside regions, and this may cause a misregistration. This may occur in a case where an image feature is locally present and other similar image features (e.g., other blood vessels) are densely present, such as blood vessels that are a major feature of an inside region of an organ. For example, there may be a case where the positions of different blood vessels in images are associated in a preceding step in multi-step registration. In this case, since the image feature is locally present, the registration falls into a local solution, and it is difficult to solve this even if detailed registration is performed in a subsequent step. Meanwhile, the contour shape of an organ is a broader image feature than a fine structure such as the blood vessels. The broader image feature is less likely to fall into a local solution even in a case where a misregistration remains in a preceding step in multi-step registration, and it is comparatively easy to achieve the registration by performing detailed registration in a subsequent step. Thus, the positions of the inside regions are selectively adjusted to correspond using the contour-reduced images prior to the original images so that the positions of the entire observed parts are adjusted to correspond with great accuracy.

By the foregoing processing, the deformation information about the observed part between the first and second medical images is estimated and acquired.

While the three-step registration from step S222 to step S226 has been described above in the present exemplary embodiment, aspects of the present invention are not limited to those described herein. For example, multi-step registration including two steps or four or more steps can be employed. In this case, for example, images for use in the registration can be changed between the original images (the first and second medical images) and the contour-reduced images in each step, or the registration between one of the original images (the first and second medical images) and the contour-reduced images can be performed consecutively in a plurality of steps and the other of the original images (the first and second medical images) and the contour-reduced images can be performed in a subsequent step. Further, single-step registration instead of the multi-step registration can be employed. In this case, deformation information estimated as a result of registration between the first and second contour-reduced images is determined as the deformation information between the first and second medical images, and the processing proceeds to step S230.

While the processing of step S226 is performed after the processing of step S224 according to the present exemplary embodiment, order of steps is not limited to the one described herein, and the processing of step S226 can be performed before the processing of step S224.

(Step S230) (Calculation of Dynamic Information)

Referring back to the flowchart in FIG. 2 again, in step S230, the dynamic information calculation unit 140 calculates dynamic information about the observed part between the first and second medical images based on the deformation information estimated in step S220. Then, the dynamic information calculation unit 140 outputs the calculated dynamic information to the display control unit 150.

In the present exemplary embodiment, a local movement amount is calculated as the dynamic information. In a case where the first and second medical images are three-dimensional images, the deformation information estimated in step S220 is a three-dimensional moving vector of each pixel, and the norm of the moving vector of each pixel can be calculated as the movement amount. Further, the dynamic information is not limited to the movement amount and, for example, a volume change rate (Jacobian) can be calculated from the deformation information.

(Step S240) (Display)

In step S240, the display control unit 150 performs control to visualize the dynamic information calculated in step S230 and displays the visualized dynamic information on the display unit 12.

The movement amount calculated as the dynamic information can be visualized by generating a movement amount map and displaying the movement amount map on the display unit 12. The movement amount map is, for example, an image in which a gray scale value or a color scale value corresponding to the movement amount is stored as a pixel value in each pixel at a position in the lung fields in the first medical image. The movement amount map can be displayed next to the first and second medical images or can be superimposed and displayed on the first medical image. Alternatively, a movement amount map in which the movement amount is stored as a pixel value in each pixel at a position in the lung fields in not the first medical image but the second medical image can be employed. In this case, the movement amount map can be superimposed and displayed on the second medical image. Further, the dynamic information other than the movement amount can be visualized and displayed on the display unit 12 by a similar method.

The movement amount map is not the only visualization method and, for example, a numerical value of a movement amount or a volume change rate of a user-designated position can be displayed.

The processing of the information processing apparatus 10 is performed as described above.

According to what is described above, an effect of a local change near the contour of the observed part on the estimation of deformation is reduced, and the accuracy of registration between the images increases. Furthermore, the dynamic information about the observed part is consequently measured with great accuracy and visualized.

While step S230 is performed to calculate the dynamic information and step S240 is performed to control the display of the dynamic information in the above-described exemplary embodiment, aspects of the present invention are not limited to those described herein. Specifically, these processes can be skipped, and only the deformation information acquired in step S220 can be output. Alternatively, a process other than those described above can be performed using the deformation information acquired in step S220. This increases the accuracy of the registration processing between the images for another purpose. For example, in a case where the first and second medical images are images of the same subject that are captured on different dates, the processing can be used in deformation registration between the images to generate a temporal difference image.

The term image according to the present exemplary embodiment refers to not only an image displayed on the display unit 12 but also data to be displayed.

(Modification 1-1) (Method of Generating Contour-Reduced Image)

While a specific example of a process of generating a contour-reduced image from step S212 to step S216 is described above, a method of generating a contour-reduced image is not limited to the one described herein. For example, the contour information can be reduced by performing smoothing processing on the vicinity (the contour portion, which is a region including the contour) of the contour in the region of the observed part that is extracted in step S212 as a target using a moving average filter and decreasing the gradient of the pixel values near the contour. Alternatively, the contour information can be reduced by performing spatial frequency filtering processing to reduce spatial frequency components of the contour.

(Modification 1-2) (Performing Registration Using Contour-Reduced Images Only)

While a specific example of processes of estimating deformation information from step S222 to step S226 is described above, a method of estimating the deformation information is not limited to the one described herein. For example, the original images (the first and second medical images) do not have to be used in estimating the deformation information. Specifically, in step S222, initial registration is performed between the contour-reduced images with reduced resolutions, and a result of the registration in step S224 can be determined as final deformation information about the observed part between the first and second medical images. Alternatively, in step S226, detailed registration can be performed using the contour-reduced images. This produces an effect that since the registration between the inside regions of the observed parts is selectively performed, deformation information about the inside region is estimated with greater accuracy while the estimation accuracy of the deformation information about the contour of the observed part between the first and second medical images may decrease. Further, the process of step S224 and the process of step S226 can be performed alternately a plurality of times.

(Modification 1-3) (Use of a Plurality of Contour-Reduced Images of Different Levels of Contour Reduction in Registration)

While a single type of a contour-reduced image is generated for each of the first and second medical images in step S212 to step S216, a plurality of first contour-reduced images of different levels of contour information reduction and a plurality of second contour-reduced images of different levels of contour information reduction can be generated. For example, in contracting the foreground pixel region in step S214, a plurality of masked images is generated using different sizes of a structuring element for use in morphology transformation, and a plurality of contour-reduced images masked using the plurality masked images is generated. In this case, the greater the structuring element, the smaller the foreground pixel region of the masked image, and the reduction level of the contour information about the contour-reduced image after the mask processing increases. Then, in step S224, the number of steps of the registration between the contour-reduced images does not have to be one and can be increased based on the number of generated contour-reduced images. For example, in a case where three types of first contour-reduced images and three types of second contour-reduced images are generated using different reduction levels of contour information, the number of steps of the registration between the contour-reduced image can be three, and the registration can be performed starting with the image with the lowest reduction level of contour information in ascending order of reduction level. This produces an effect that a fall into a local solution due to an initial misregistration is prevented in a case where an image feature near the contour of the observed part is indistinct, because the registration is performed in ascending order of distance from the center of the inside region.

(Modification 1-4) (Contour-Reduced Images are not Generated)

While the first and second contour-reduced images are generated in step S216, the deformation information can be estimated without generating and outputting the contour-reduced images. In this case, the contour-reduced image generation unit 120 outputs the first masked image and the second masked image generated in step S214 to the deformation information estimation unit 130. Then, in step S224, the image similarity between the first and second medical images is calculated based on whether the position of each pixel of the second medical image that corresponds to a pixel of the first medical image is a foreground pixel on each of the first masked image and the second masked image. Specifically, in a case where the position is a foreground pixel on the first masked image, the pixel value on the first medical image is used in calculating the image similarity, whereas in a case where the position is a background pixel, the representative value of the first medical image is used in calculating the image similarity. Similarly, in a case where the position is a foreground pixel on the second masked image, the pixel value on the second medical image is used in calculating the image similarity, whereas in a case where the position is a background pixel, the representative value of the second medical image is used in calculating the image similarity. Thus, a process equivalent to that according to the present exemplary embodiment is performed without generating the first and second contour-reduced images. Alternatively, a weight can be set based on a distance from the contour in calculating the image similarity to match selectively the positions of the inside regions. Specifically, the positions of the inside regions are selectively matched by setting the weight so that the image similarity to be calculated increases at greater distances toward the inside from the contour of the observed part.

(Modification 1-5) (Blur Level is Increased at Shorter Distances to the Contour)

In step S216, the blur processing on the contour in the contour portion does not necessarily have to be performed independently of the region (also referred to as the inside region) that is inside the observed part (target object) (inside the lung field) and is not included in the contour portion. For example, the blur level (e.g., kernel size of smoothing) is increased at positions at shorter distances to the contour, and not only the contour portion but also the inside of the target object can be blurred. This generates a contour-reduced image with relatively reduced contour information because the gradient of pixel values of the contour portion is likely to be decreased compared to the gradient of pixel values of the inside of the target object.

(Modification 1-6) (Second Contour is Blurred Based on First Contour Information)

In step S216, the second contour-reduced image in which the contour information about the observed part in the second medical image is reduced is generated using the second masked image, but the second contour-reduced image can be generated using the first masked image. For example, in a case where the movement near the contour of the observed part is small between the first and second medical images, the difference between the first masked image and the second masked image is also small, so that a second contour-reduced image equivalent to the second contour-reduced image according to the above-described exemplary embodiment can be generated by reducing the contour information about the observed part in the second medical image using the first masked image. This increases processing speed because the second contour-reduced image is generated without generating the second masked image.

In generating the contour-reduced image, a similar effect is produced as long as at least the processing (blur processing) of reducing the contour information is performed on the contour portion, which is a region including the contour. Thus, the contour-reduced image can be generated by performing the processing of reducing the contour information only on a region having a margin width of a predetermined number of pixels inside the contour and outside the contour.

The processing (blur processing) of reducing the contour information in generating the contour-reduced image includes the processing of erasing the contour.

Each technique described in the present specification can be implemented as, for example, a system, an apparatus, a method, a program, or a recording medium (storage medium). Specifically, the technique is applicable to a system including a plurality of devices (e.g., host computers, interface devices, imaging apparatuses, web applications) or to an apparatus consisting of a single device.

Further, it is apparent that a purpose of the technique according to the disclosure of the present specification is achieved as described below. Specifically, a recording medium (or storage medium) recording program codes (computer program) of software configured to implement the functions according to the above-described exemplary embodiment is supplied to a system or an apparatus. The recording medium is obviously a computer-readable recording medium. Then, a computer (or a CPU or a microprocessing unit (MPU)) of the system or the apparatus reads the program codes stored in the recording medium and executes the read program codes. In this case, the program codes read from the recording medium are to implement the functions according to the above-described exemplary embodiment, and the recording medium recording the program codes is also encompassed within the technique according to the disclosure of the present specification.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-158455, filed Sep. 23, 2020, which is hereby incorporated by reference herein in its entirety.

What is claimed is:
1. An information processing apparatus comprising:
at least one memory storing executable instructions; and
at least one processor that, upon execution of the stored instructions, is configured to operate as:

a first acquisition unit configured to acquire a first medical image of a target object and a second medical image of the target object captured at different time phases from each other;

a second acquisition unit configured to acquire first contour information about a first contour being a boundary between the target object and a region outside the target object in the first medical image and second contour information about a second contour being a boundary between the target object and a region outside the target object in the second medical image;

a generation unit configured to generate first processed information in which a first contour region is blurred by performing processing of decreasing a gradient of pixel value between pixels in the first contour region based on the first contour information or the second contour information and second processed information in which a second contour region is blurred by performing processing of decreasing a gradient of pixel value between pixels in the second contour region based on the first contour information or the second contour information, wherein the first contour region is a region that includes the first contour and pixels adjacent to the first contour, and the second contour region is a region that includes the second contour and pixels adjacent to the second contour; and a third acquisition unit configured to acquire deformation information about a deformation in the target object between the first medical image and the second medical image based on the first processed information and the second processed information.

2. The information processing apparatus according to claim 1, wherein the generation unit generates the first processed information by performing blur processing on the first contour region being a region including the first contour and a pixel neighboring the first contour, and wherein the generation unit generates the second processed information by performing blur processing on the second contour region being a region including the second contour and a pixel neighboring the second contour.

3. The information processing apparatus according to claim 1, wherein the processing of decreasing the gradient between the pixel value of the pixel and the pixel value of the other pixel adjacent to the pixel includes processing of smoothing the pixel value of the pixel and the pixel value of the other pixel adjacent to the pixel.

4. The information processing apparatus according to claim 1, wherein the processing of decreasing the gradient between the pixel value of the pixel and the pixel value of the other pixel adjacent to the pixel is processing of applying a pixel value inside the target object in the first medical image as a pixel value outside the target object in the first medical image and applying a pixel value inside the target object in the second medical image as a pixel value outside the target object in the second medical image.

5. The information processing apparatus according to claim 2, wherein the generation unit performs processing of decreasing a change in a pixel value between a pixel and another pixel adjacent to the pixel on the first contour and in the region outside the target object in the first medical image, and performs processing of decreasing a change in a pixel value between a pixel and another pixel adjacent to the pixel on the second contour and in the region outside the target object in the second medical image.

6. The information processing apparatus according to claim 2, wherein the first processed information includes a first processed image in which the first contour in the first contour region is blurred based on the first contour information independently of a region that is inside the target object in the first medical image and is not included in the first contour region, and wherein the second processed information includes a second processed image in which the second contour in the second contour region is blurred based on the second contour information independently of a region that is inside the target object in the second medical image and is not included in the second contour region.

7. The information processing apparatus according to claim 1, wherein the generation unit generates the first processed information and the second processed information by masking the first contour and the second contour.

8. The information processing apparatus according to claim 1, wherein the generation unit generates the first processed information and the second processed information by erasing the first contour and the second contour.

9. The information processing apparatus according to claim 1, wherein the generation unit generates the first processed information by performing blur processing on the target object in the first medical image based on a distance between the target object and the first contour, and wherein the generation unit generates the first processed information by performing blur processing on the target object in the second medical image based on a distance between the target object and the second contour.

10. The information processing apparatus according to claim 9, wherein the generation unit generates the first processed information by performing blur processing of increasing blur level at shorter distances to the first contour, and wherein the generation unit generates the second processed information by performing the blur processing of increasing blur level at shorter distances to the second contour.

11. The information processing apparatus according to claim 1, wherein the third acquisition unit performs first registration processing of registration between the target object in the first medical image and the target object in the second medical image, performs second registration processing of registration between the target object in the first processed information and the target object in the second processed information based on a result of the first registration processing, and acquires deformation information about the target object between the first medical image and the second medical image based on a result of the second registration processing.

12. The information processing apparatus according to claim 1, wherein the third acquisition unit displays information about the deformation in the target object between the first medical image and the second medical image on a display unit based on the deformation information.

13. The information processing apparatus according to claim 1, wherein the target object is a lung, and the deformation information is dynamic information about the lung.

14. An information processing method comprising:

acquiring a first medical image of a target object and a second medical image of the target object captured at different time phases from each other;

acquiring first contour information about a first contour being a boundary between the target object and a region outside the target object in the first medical image and second contour information about a second contour being a boundary between the target object and a region outside the target object in the second medical image;

generating first processed information in which a first contour region is blurred by performing processing of decreasing a gradient of pixel value between pixels in the first contour region in the first medical image based on the first contour information and second processed information in which a second contour region is blurred by performing processing of decreasing a gradient of pixel value between pixels in the second contour region in the second medical image based on the second contour information, wherein the first contour region is a region that includes the first contour and pixels adjacent to the first contour, and the second contour region is a region that includes the second contour and pixels adjacent to the second contour; and acquiring deformation information about the target object between the first medical image and the second medical image based on the first processed information and the second processed information.

15. A non-transitory computer-readable recording medium recording a program for executing the information processing method according to claim 14.

16. An information processing apparatus comprising:

at least one memory storing executable instructions; and at least one processor that, upon execution of the stored instructions, is configured to operate as:

a first acquisition unit configured to acquire a first medical image of a target object and a second medical image of the target object captured at different time phases from each other;

a second acquisition unit configured to acquire first contour information about a first contour being a boundary between the target object and a region outside the target object in the first medical image and second contour information about a second contour being a boundary between the target object and a region outside the target object in the second medical image;

a generation unit configured to generate first processed information in which an inside region of the target object is enhanced by blurring the first contour based on the first contour information or the second contour information and second processed information in which the inside region of the target object is enhanced by blurring the second contour based on the first contour information or the second contour information;

a third acquisition unit configured to acquire first deformation information about a deformation in the target object between the first medical image and the second medical image based on first registration processing that registers the target object in the acquired first and second medical images, acquire second deformation information based on a second registration processing that uses the first deformation information to register the target object in the first processed information and the second processed information, and acquire third deformation information using the acquired second deformation information from the first processed information and second processed information and the acquired first and second medical images a dynamic information calculation unit configured to calculate dynamic information representative of movement of the target object between the acquired first medical image and the acquired second medical image using the third deformation information.

* * * * *